(12) United States Patent
Mehrabani (10) Patent No.: US 12,556,249 B2
(45) Date of Patent: *Feb. 17, 2026

(54) WIRELESS COMMUNICATION SYSTEM BASED ON MMWAVE RF REPEATERS

(71) Applicant: AR & NS Investment, LLC, Newport Coast, CA (US)

(72) Inventor: Alireza Tarighat Mehrabani, Los Angeles, CA (US)

(73) Assignee: PELTBEAM, INC., Sherman Oaks, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 18/358,553

(22) Filed: Jul. 25, 2023

(65) Prior Publication Data

US 2023/0370136 A1 Nov. 16, 2023

Related U.S. Application Data

(63) Continuation of application No. 16/910,291, filed on Jun. 24, 2020, now Pat. No. 11,711,126.

(51) Int. Cl.
*H04B 7/06* (2006.01)
*H04B 3/36* (2006.01)
(Continued)

(52) U.S. Cl.
CPC .......... *H04B 7/0617* (2013.01); *H04B 7/10* (2013.01); *H04B 7/15521* (2013.01);
(Continued)

(58) Field of Classification Search
CPC .... H04B 7/0617; H04B 7/10; H04B 7/15521; H04B 17/12; H04B 3/36; H04B 7/15528; H04W 72/0453
See application file for complete search history.

(56) References Cited

U.S. PATENT DOCUMENTS 8,346,091 B2 1/2013 Kummetz et al.
9,661,470 B1 5/2017 Du et al.
(Continued)

FOREIGN PATENT DOCUMENTS

WO 2020166253 A1 8/2020

OTHER PUBLICATIONS

Notice of Allowance for U.S. Appl. No. 18/480,885 dated Jul. 10, 2024.
(Continued)

*Primary Examiner* — Oussama Roudani
(74) *Attorney, Agent, or Firm* — CHIP LAW GROUP (57) ABSTRACT

A wireless communication system based on millimeter wave (mmWave) radio frequency (RF) repeaters includes a first communication device. The first communication device includes a digital signal processor configured to provide access to a first type of communication network to a plurality of communication systems that are communicatively coupled to the first communication device via a plurality of different type of wireless networks. A plurality of radio frequency (RF) signals corresponding to different communication protocols is obtained via the plurality of different type of wireless networks. A frequency of each of the obtained plurality of RF signals are upconverted to a different frequency such that each of the plurality of RF signals gets a different upconverted frequency and further the upconverted frequency is transmitted to a second communication device.

18 Claims, 4 Drawing Sheets

(51) Int. Cl.
*H04B 7/10* (2017.01)
*H04B 7/155* (2006.01)
*H04B 17/12* (2015.01)
*H04W 72/0453* (2023.01)

(52) U.S. Cl.
CPC ........ *H04B 17/12* (2015.01); *H04W 72/0453* (2013.01); *H04B 3/36* (2013.01)

(56) References Cited

U.S. PATENT DOCUMENTS

| | | | |
|---|---|---|---|
| 10,180,729 | B2 | 1/2019 | Park et al. |
| 10,291,311 | B2 | 5/2019 | Gerszberg |
| 10,291,334 | B2 | 5/2019 | Henry et al. |
| 10,506,384 | B1 | 12/2019 | Omer et al. |
| 10,872,453 | B2 | 12/2020 | Yokokawa |
| 11,476,894 | B2 | 10/2022 | Tarighat |
| 11,516,824 | B2* | 11/2022 | Kong .................. H04B 7/0695 |
| 11,764,829 | B2 | 9/2023 | Mehrabani |
| 11,989,965 | B2 | 5/2024 | Tarighat Mehrabani |
| 2006/0217075 | A1* | 9/2006 | Sunaga ................ H04B 7/0871 455/69 |
| 2009/0131021 | A1 | 5/2009 | Vogedes et al. |
| 2011/0136503 | A1 | 6/2011 | Sridhara et al. |
| 2013/0290911 | A1 | 10/2013 | Praphul et al. |
| 2014/0050211 | A1* | 2/2014 | Kim ..................... H04B 7/0617 370/338 |
| 2014/0206406 | A1* | 7/2014 | Cordeiro ........... H04W 72/0453 455/501 |
| 2015/0077336 | A1 | 3/2015 | Elangovan |
| 2015/0363035 | A1 | 12/2015 | Hinckley et al. |
| 2016/0143079 | A1 | 5/2016 | Yoon et al. |
| 2016/0203362 | A1 | 7/2016 | Huang et al. |
| 2017/0018831 | A1 | 1/2017 | Henry et al. |
| 2017/0097413 | A1 | 4/2017 | Gillian et al. |
| 2017/0188188 | A1 | 6/2017 | Kang |
| 2018/0115080 | A1 | 4/2018 | Hussain et al. |
| 2018/0166784 | A1 | 6/2018 | Johnson et al. |
| 2019/0280759 | A1 | 9/2019 | Bennett et al. |
| 2019/0313386 | A1 | 10/2019 | Hwang et al. |
| 2020/0052950 | A1 | 2/2020 | Manolakos et al. |
| 2020/0091608 | A1 | 3/2020 | Alpman et al. |
| 2020/0134899 | A1 | 4/2020 | Yokokawa |
| 2020/0294318 | A1 | 9/2020 | Ernst et al. |
| 2020/0334452 | A1 | 10/2020 | Gurbuz et al. |
| 2020/0350980 | A1 | 11/2020 | Rofougaran et al. |
| 2020/0366363 | A1 | 11/2020 | Li et al. |
| 2020/0393555 | A1 | 12/2020 | Kletsov et al. |
| 2021/0373919 | A1 | 12/2021 | Davenport et al. |
| 2022/0036043 | A1 | 2/2022 | Sakashita |
| 2022/0089179 | A1 | 3/2022 | Sakamoto et al. |

OTHER PUBLICATIONS

Notice of Allowance for U.S. Appl. No. 18/362,885 dated Jun. 28, 2024.
Notice of Allowance for U.S. Appl. No. 18/358,143 dated Jul. 17, 2024.
Notice of Allowance for U.S. Appl. No. 18/068,814 dated Apr. 26, 2023.
Notice of Allowance for U.S. Appl. No. 17/819,894 dated Mar. 22, 2023.
Notice of Allowance for U.S. Appl. No. 17/563,168 dated Oct. 26, 2022.
Notice of Allowance for U.S. Appl. No. 17/409,128 dated Sep. 21, 2022.
Notice of Allowance for U.S. Appl. No. 17/114,437 dated May 4, 2022.
Notice of Allowance for U.S. Appl. No. 16/911,036 dated May 25, 2021.
Final Office Action for U.S. Appl. No. 16/910,291 dated Jan. 24, 2022.
Final Office Action for U.S. Appl. No. 16/910,537 dated Aug. 23, 2022.
Final Office Action for U.S. Appl. No. 17/114,437 dated Jan. 14, 2022.
Final Office Action for U.S. Appl. No. 18/358,143 dated Jun. 6, 2024.
Non-Final Office Action for U.S. Appl. No. 16/910,291 dated Aug. 16, 2021.
Non-Final Office Action for U.S. Appl. No. 16/910,537 dated Feb. 2, 2023.
Non-Final Office Action for U.S. Appl. No. 16/910,537 dated May 25, 2022.
Non-Final Office Action for U.S. Appl. No. 17/114,437 dated Sep. 30, 2021.
Non-Final Office Action for U.S. Appl. No. 17/819,894 dated Dec. 7, 2022.
Notice of Allowance for U.S. Appl. No. 16/910,291 dated Nov. 4, 2022.
Notice of Allowance for U.S. Appl. No. 16/910,413 dated Sep. 22, 2021.
Non-Final Office Action for U.S. Appl. No. 18/358,143 dated Feb. 15, 2024.
Non-Final Office Action for U.S. Appl. No. 18/362,885 dated Feb. 29, 2024.
Notice of Allowance for U.S. Appl. No. 16/910,537 dated Nov. 30, 2023.
Final Office Action for U.S. Appl. No. 18/605,133, dated Jun. 24, 2025.
Non-Final Office Action for U.S. Appl. No. 18/605,133, dated Apr. 11, 2025.
Final Office Action for U.S. Appl. No. 16/910,537 dated Aug. 11, 2023.
Notice of Allowance for U.S. Appl. No. 18/161,928 dated Jul. 28, 2023.

* cited by examiner

WIRELESS COMMUNICATION SYSTEM BASED ON MMWAVE RF REPEATERS

CROSS-REFERENCE TO RELATED APPLICATIONS/INCORPORATION BY REFERENCE

This Application makes reference to, claims priority to, and claims benefit from, and is a Continuation Application of U.S. Pat. No. 11,711,126 issued on Jul. 25, 2023.

FIELD OF TECHNOLOGY

Certain embodiments of the disclosure relate to a wireless communication system. More specifically, certain embodiments of the disclosure relate to wireless communication system based on millimeter wave (mmWave) radio frequency (RF) repeaters.

BACKGROUND

Conventional communication devices, such as a wireless access point (WAP), are often used to extend the wireless coverage of an existing Wi-Fi signal to access Internet and to increase the numbers of end devices (users) that are capable to use Wi-Fi may connect to the WAP. However, Wi-Fi signals by virtue of the limitation of the Wi-Fi communication protocol have a defined range beyond which the connectivity is lost. Thus, a large number of WAPs or range extenders are used if wireless coverage for Wi-Fi signals are to be extended. Moreover, under ideal conditions, typically 2.4 GHz Wi-Fi supports up to 450 Mbps or 600 Mbps, and 5 GHz Wi-Fi supports up to 1300 Mbps. Thus, the data transmission over such narrow bandwidth is much lower as compared to higher radio frequencies. In case of Bluetooth network, the coverage and data transmission rate is even much less than conventional Wi-Fi network. Currently, certain communication devices, such as Internet-of-Things (IoT) devices depend on high-speed Internet access to the cloud to send sensor data and receive instructions (e.g. artificial intelligence-based processing models) from cloud either directly or via a gateway device. The number of wireless sensors and IoT devices are rapidly increasing with the increase in smart homes, smart offices, enterprises, etc. Existing Wi-Fi standards are unbale to handle such massive number of wireless sensors and IoT devices and their quality-of-service (QoS) requirements. Further, some of the communication devices may not support cellular communication or Wi-Fi or may support some other communication protocols (e.g. Bluetooth low energy protocol only). In such cases, it is extremely difficult and technically challenging to support these end user devices having different communication capabilities and connectivity needs.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A wireless communication system based on millimeter wave (mmWave) radio frequency (RF) repeaters, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a wireless communication system based on millimeter wave (mmWave) radio frequency (RF) repeaters. The wireless communication system and method of the present disclosure enables not only improvements in data transfer rates between at least two communication devices as compared to existing wireless systems (e.g. conventional wireless local area networks), but also provides an always-connected experience as a result of its multiprotocol feature, which provides a capability to handle different wireless communication protocols concurrently in terms of extending their range as well as increasing bandwidth concurrently for high performance wireless content communication. In the following description, reference is made to the accompanying drawings, which form a part hereof, and in which is shown, by way of illustration, various embodiments of the present disclosure.

Figure 1:
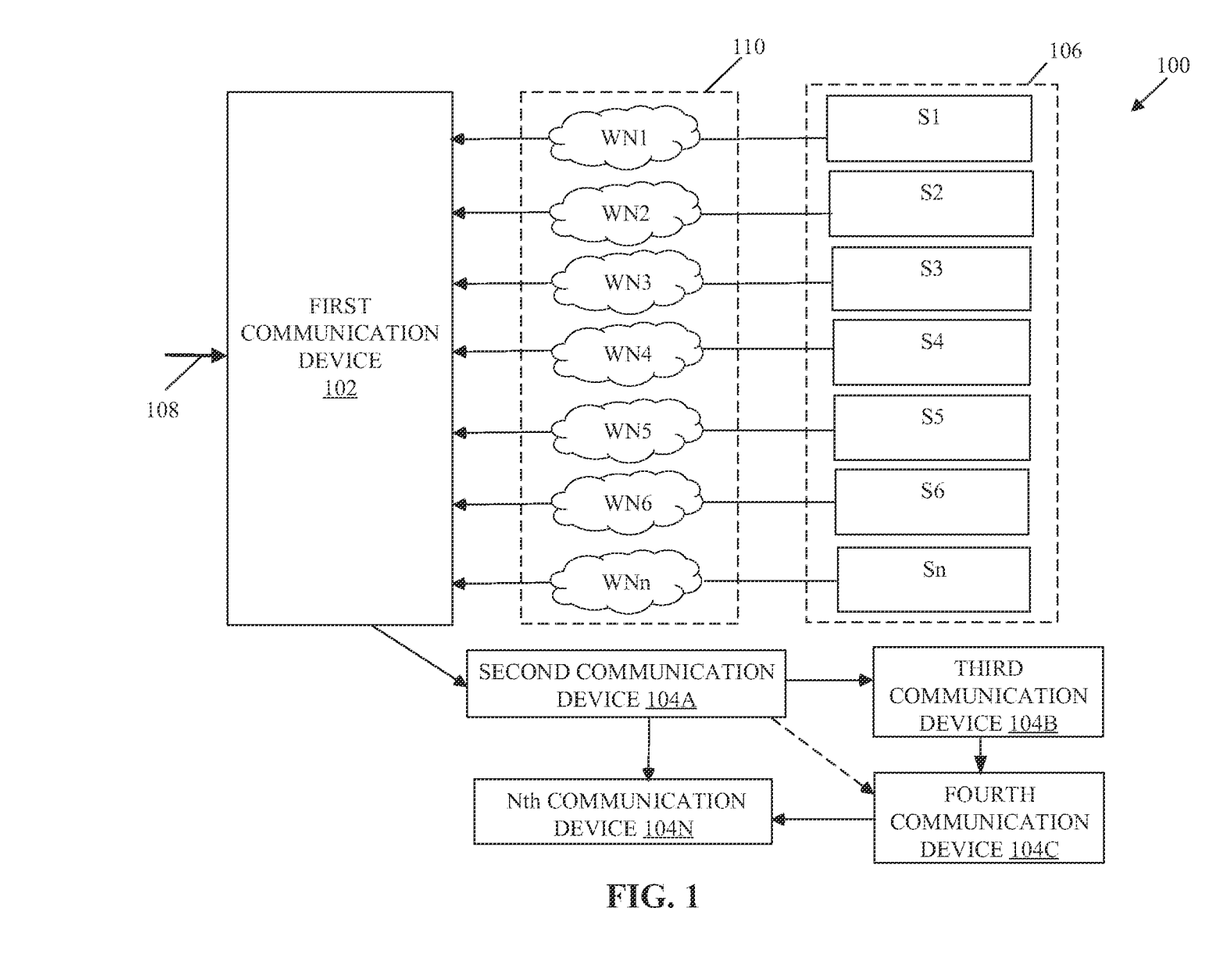
FIG. 1 is an illustration of an exemplary wireless communication system based on millimeter wave (mmWave) radio frequency (RF) repeaters, in accordance with an exemplary embodiment of the disclosure.

FIG. 1 is an illustration of an exemplary wireless communication system based on millimeter wave (mmWave) radio frequency (RF) repeaters. With reference to FIG. 1, there is shown a wireless communication system 100 that may include a first communication device 102, which may be a central communication device. The wireless communication system 100 further includes a plurality of second communication devices 104A to 104N (namely, a second communication device 104A, a third communication device 104B, a fourth communication device 104C, and an Nth communication device 104N). There is further shown a plurality of communication systems 106, a first type of communication network 108, and a plurality of different type of wireless networks 110.

The first communication device 102 may be a networking hardware that acts as a central communication device and a gateway (or a mediator) between the first type of communication network 108 (e.g. Internet) and the plurality of different type of wireless networks 110. The first communication device 102 includes suitable logic, circuitry, and interfaces that may be configured to provide access to the first type of communication network 108 to the plurality of communication systems 106. The plurality of communication systems 106 may be communicatively coupled to the first communication device 102 via the plurality of different type of wireless networks 110. The first communication device 102 may be a multiprotocol wireless range extender device that has a capability to extend range of different RF signals communicated over a plurality of different communication protocols (e.g. Wi-Fi, Bluetooth, Zigbee, cellular signals, and other wireless communication protocols) at the same time. Examples of the first communication device 102 may include, but is not limited to a home gateway device, a fifth generation (5G) modem, a backplane system, an evolved-universal terrestrial radio access-new radio (NR) dual connectivity (EN-DC) device, a 5G wireless access point, an advanced router, a bridge router, a network controller, a fixed wireless access (FWA) device, a server, a firewall device, or a network security device.

Each of the plurality of second communication devices 104A to 104N includes suitable logic, circuitry, and interfaces that may be configured to communicate with the first communication device 102 and one or more other second communication devices of the plurality of second communication devices 104A to 104N. For example, the second communication device 104A may be configured to communicate with the first communication device 102, and one or more of other second communication devices of the plurality of second communication devices 104A to 104N in a parallel transmission or a chain transmission. In an implementation, in order to execute the chain transmission, the second communication device 104A may be a relay node that may communicate any RF signal received from the first communication device 102 further to the third communication device 104B, which in turn may further communicate the RF signal to the fourth communication device 104C, and so forth. Examples of the each of the plurality of second communication devices 104A to 104N (such as the second communication device 104B) may include, but is not limited to a 5G wireless access point, a multiprotocol wireless range extender device, an evolved-universal terrestrial radio access-new radio (NR) dual connectivity (EN-DC) device, a NR-enabled relay node, a NR-enabled repeater device, a wireless local area network (WLAN)-enabled device, or a wireless personal area network (WPAN)-enabled device.

Each of the plurality of communication systems 106 (e.g. S1 to Sn) includes suitable logic, circuitry, and interfaces that may be configured to communicate with the first communication device 102 in order to access the first type of communication network 108 (e.g. the Internet). The plurality of communication systems 106 may be communicatively coupled to the first communication device 102 via the plurality of different type of wireless networks 110. Each of the plurality of communication systems 106 may be configured to communicate with the first communication device 102 in a plurality of different range of frequencies, such as 2.4 GHz, 5 GHz, or sub 6 GHz bands, which are typically considered as narrow bandwidths. Examples of the plurality of communication systems 106 may include, but is not limited to one or more wireless access points (e.g. a 2.4 GHz based wireless access point and a 5 GHz multiple input multiple output) MIMO capable wireless access point), a camera system, a radar system, an Internet-of-Things (IoT) controller, an IoT device, a Wi-Fi only device, a Bluetooth only device, a Zigbee only device, an orthogonal frequency division multiplexing (OFDM) communication system, a cellular communication system, such as a 2G, 3G, 4G, or 5G NR-enabled communication system.

In an implementation, the first type of communication network 108 may be a wired network, such as an optical fibre connection, which provides high-speed access (e.g. multi-gigabits data rate) to a core network, for example, Internet. In another implementation, the first type of communication network 108 may be a 5G cellular communication network having high data transfer rate.

The plurality of different type of wireless networks 110 (e.g. WN1 to WNn) correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network.

In operation, the first communication device 102 may be communicatively coupled to the first type of communication network 108. In an implementation, the first communication device 102 may be connected to a modem. In another implementation, the first communication device 102 may be integrated with the modem (i.e. the functionalities of a modem may be integrated with the first communication device 102). The first communication device 102 may be configured to provide access to the first type of communication network 108 to the plurality of communication systems 106 that are communicatively coupled to the first communication device 102 via the plurality of different type of wireless networks 110. In an example, the plurality of different type of wireless networks 110 may include a first Wi-Fi network operating in a first frequency, a second Wi-Fi network operating in a second frequency that is different from the first frequency, or other low power Wi-Fi network (such as IEEE 802.11ah, also known as Wi-Fi "HaLow" or other variation of Wi-Fi based on IEEE 802.11), a Bluetooth network, a Bluetooth low energy (BLE) network, a wireless sensor network (e.g. adaptive network topology based network), a Zigbee network, a cellular network, an infrared communication, a radio frequency for consumer electronics (RF4CE), or other short-range wireless communication network, such as a wireless personal area network.

The first communication device 102 may be configured to obtain a plurality of RF signals corresponding to different communication protocols via the plurality of different type of wireless networks 110. The different communication protocols may correspond to (i.e. may include) a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, or different variations of wireless wide area network (WWAN), wireless local area network (WLAN), or wireless personal area network (WPAN) protocols. In an example, the first communication device 102 may include (i.e. may be realized by) various components, such as RF front-end (transmitter front-ends and receiver front-ends), a digital signal processor, low-noise amplifiers, phase shifters, power combiners, power dividers, power amplifiers, logical control units, a combination of functionalities of modems, a phased lock loop (PLL) circuits, and mixers.

In accordance with an embodiment, the first communication device 102 may be further configured to upconvert a frequency of each of the plurality of RF signals to a different frequency. In an example, data received over the plurality of RF signals may be converted in the form of bits, before transmission of such bits over-the-air using a mmWave RF signal by manipulation of frequency and one or more other signal characteristic, such as amplitude, and/or phase, of the mmWave RF signal. In an example, higher order modulation schemes, such as 16 QAM, 64 QAM, may be used to allow more information to be packed into a single radio wave, which improves spectral efficiency of wireless communication.

In accordance with an embodiment, the first communication device 102 may be further configured to generate mmWave RF waveform of a specified frequency. In accordance with an embodiment, the first communication device 102 may be further configured to map and align the plurality of RF signals corresponding to different communication protocols in the mmWave RF signal (e.g. the generated mmWave RF waveform) in accordance to a number of source antennas from which the plurality of RF signals are obtained. For example, if a communication system of the plurality of communication systems 106 has two antennas, then these two antennas may be mapped to two corresponding RF signals in the mmWave RF signal. An example of mapping is shown and described in FIG. 3. The first communication device 102 may be further configured to merge the obtained plurality of RF signals corresponding to different communication protocols into the mmWave RF signal of the specified frequency. In an example, the plurality of RF signals upconverted at a different frequency are multiplexed by frequency division multiplexing. In another example, the plurality of RF signals at different frequency are multiplexed by time-division multiplexing.

The first communication device 102 may be further configured to transmit the mmWave RF signal of the specified frequency to the second communication device 104A. In an implementation, the first communication device 102 may be further configured to provide the mmWave RF signal of the specified frequency to the plurality of second communication devices 104A to 104N in a chain transmission. In another implementation, the first communication device 102 may be further configured to provide the mmWave RF signal of the specified frequency to the plurality of second communication devices 104A to 104N in a parallel transmission. In an implementation, the specified frequency of the mmWave RF signal is in the range of 10 gigahertz (GHz) to 300 GHz. In another implementation, the specified frequency of the mmWave RF signal is in the range of 55 gigahertz (GHz) to 65 GHz. In yet another implementation, the specified frequency of the mmWave RF signal is 60 gigahertz (GHz).

In accordance with an embodiment, each of the plurality of RF signals communicated over a corresponding type of wireless network of the plurality of different type of wireless networks has a defined communication range. A coverage of the plurality of RF signals corresponding to the different communication protocols is extended beyond the defined communication range based on the transmission of the mmWave RF signal of the specified frequency that includes the plurality of RF signals. In accordance with an embodiment, the second communication device 104A may be configured to capture over-the-air the mmWave wave RF signal of the specified frequency. For example, the second communication device 104A may be configured to detect and capture a 60 GHz RF signal. The second communication device 104A may be further configured to extract, from the transmitted mmWave RF signal, a wireless wide area network signal, a wireless local area network signal, a wireless personal area network signal, or a combination thereof that corresponds to the plurality of RF signals. The second communication device 104A may be further configured to distribute the mmWave wave RF signal of the specified frequency through mmWave mesh beam networking to increase coverage for an always-connected experience. Similar to the second communication device 104A, each communication device of the plurality of second communication devices 104A to 104N is configured to extract, from the mmWave RF signal, at least one of the merged plurality of RF signals for consumption, thereby increase coverage of the plurality of RF signals for an always-connected experience. For example, a user operating an end-user device may communicate with the first communication device 102 or the second communication device 104A to receive a data item over a ZigBee network from the first communication device 102 (or the second communication device 104A) in a first room. The user carrying the end-user device may move to another room and may get connected with the third communication device 104B. However, the end-user device may continue to receive the data item from the third communication device 104B (e.g. based on extraction of the original ZigBee signal by the third communication device 104B).

Figure 2:
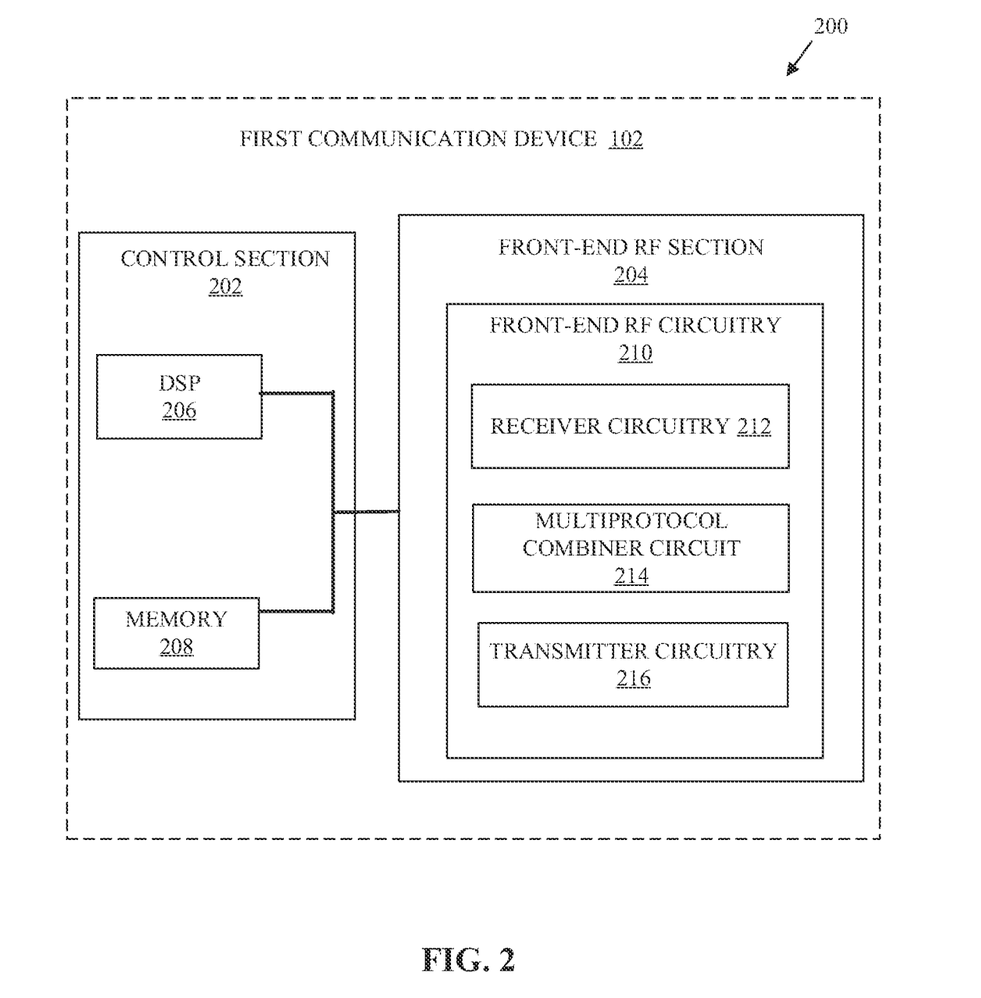
FIG. 2 is a block diagram that illustrates various components of an exemplary wireless communication system based on millimeter wave (mmWave) radio frequency (RF) repeaters, in accordance with an exemplary embodiment of the disclosure.

FIG. 2 is a block diagram that illustrates various components of an exemplary wireless communication system based on millimeter wave (mmWave) radio frequency (RF) repeaters, in accordance with an exemplary embodiment of the disclosure. FIG. 2 is explained in conjunction with elements from FIG. 1. With reference to FIG. 2, there is shown a block diagram 200 of the first communication device 102. The first communication device 102 may include a control section 202 and a front-end radio frequency (RF) section 204. The control section 202 may include a digital signal processor 206 (i.e. a DSP 206) and a memory 208. The control section 202 may be communicatively coupled to the front-end RF section 204. The front-end RF section 204 may include front-end RF circuitry 210. The front-end RF circuitry 210 may further include a receiver circuitry 212, a multiprotocol combiner circuit 214, and a transmitter circuitry 216.

The DSP 206 include suitable logic, circuitry, and/or interfaces configured to control the front-end RF circuitry 210. The first communication device 102 may be a programmable device, where the DSP 206 may execute instructions stored in the memory 208. Example of the implementation of the DSP 206 may include, but are not limited to an embedded processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors.

The memory 208 may include suitable logic, circuitry, and/or interfaces that may be configured to store instructions executable by the DSP 206. Examples of implementation of the memory 208 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity.

The front-end RF circuitry 210 may include the receiver circuitry 212, the multiprotocol combiner circuit 214, and the transmitter circuitry 216. The receiver circuitry 212 may be configured to receive (or obtain) a plurality of RF signals corresponding to different communication protocols via the plurality of different type of wireless networks 110. For example, the receiver circuitry 212 may be configured to receive Wi-Fi signals, for example, in 2.4 GHz o 5 GHz, Bluetooth signals, Zigbee signals, infrared signals, or other types of RF signals, such as wireless wide area network signals over one or more frequencies, wireless local area network signals, or wireless personal area network signals, or a combination thereof, from the plurality of communication systems 106. In an example, the receiver circuitry 212 may include a cascading receiver chain comprising various components (e.g., an antenna array, a set of low noise amplifiers (LNA), a set of receiver front end phase shifters, and a set of power combiners) for the signal reception (not shown for brevity).

The multiprotocol combiner circuit 214 may be configured to merge the obtained plurality of RF signals corresponding to different communication protocols into a mmWave RF signal of a specified frequency. In an implementation, the multiprotocol combiner circuit 214 may be configured to merge the obtained plurality of RF signals corresponding to different communication protocols under the control of the DSP 206 (e.g. when an instruction to merge is communicated by the DSP 206 to the multiprotocol combiner circuit 214, via a system bus (not shown). The obtained plurality of RF signals corresponding to different communication protocols may be multiplexed (Mux) into the mmWave RF signal of the specified frequency (e.g. 60 GHz).

The transmitter circuitry 216 may be configured to transmit the mmWave RF signal of the specified frequency, such as the mmWave RF signal, to the second communication device 104A. In an implementation, the transmitter circuitry 216 may be configured to transmit the mmWave RF signal of the specified frequency under the control of the DSP 206 (e.g. when an instruction to transmit is communicated by the DSP 206 to the transmitter circuitry 216, via the system bus. In an example, transmitter circuitry 216 may include a cascading transmitter chain comprising various components, such as a set of power dividers, a set of transmitter front end phase shifters, a set of power amplifiers (PA), and an antenna system for the transmission of the mmWave RF signal in the specified frequency. In an example, the mmWave RF signal in the specified frequency may be distributed to other communication devices of the plurality of second communication devices 106 as a beam to form a mmWave beam mesh network. In accordance with an embodiment, the front-end RF circuitry 210 may receive input RF signals and transmit the one or more mmWave RF signals in accordance with multiple-input multiple-output (MIMO) reception and transmission. In some embodiments, a phased locked loop (PLL) circuit may be provided in the first communication device 102, which acts a local oscillator and may be associated with the transmitter circuitry 216 to facilitate up conversion of each input RF signals to a different frequency before transmission.

Figure 3:
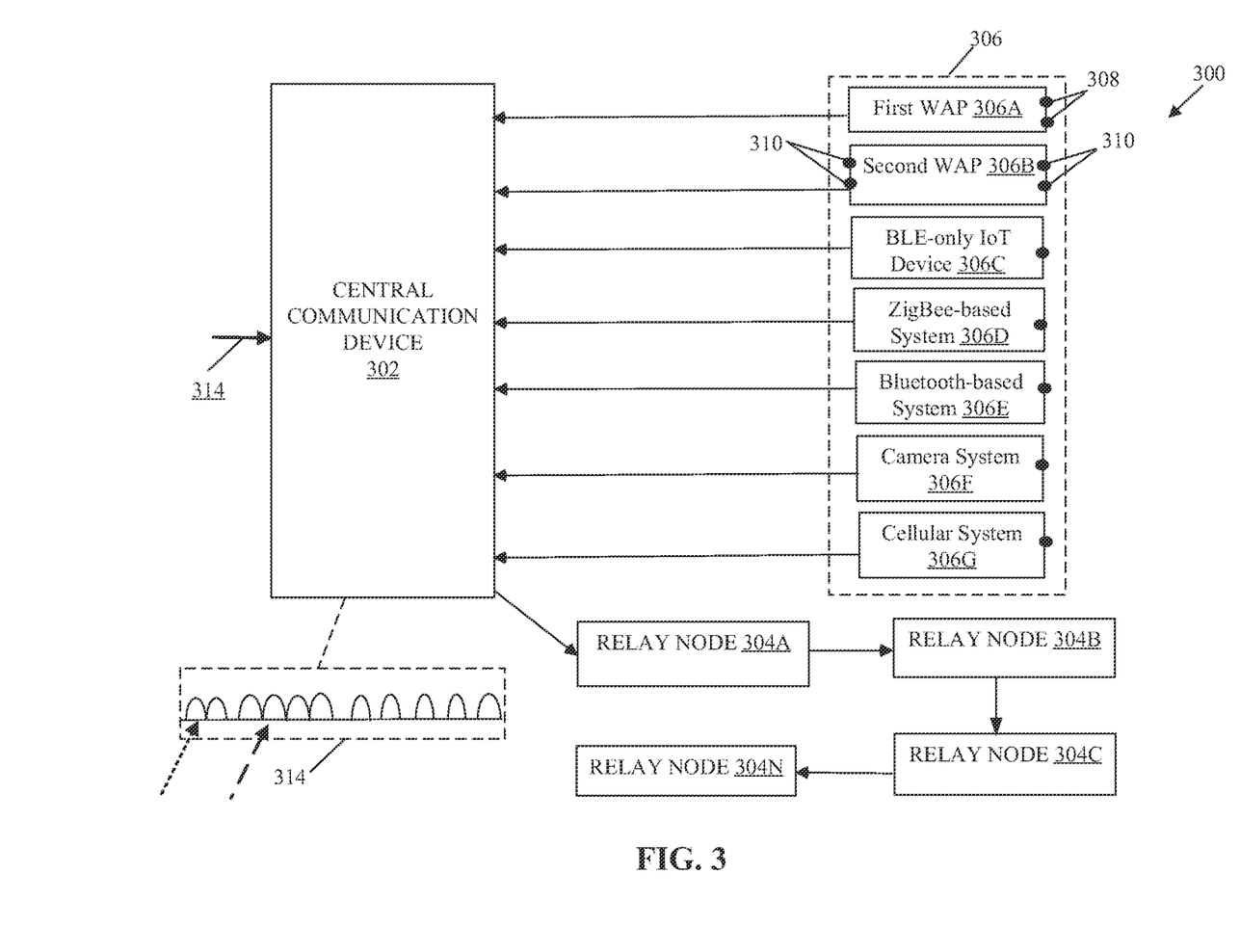
FIG. 3 is a diagram that illustrates an exemplary scenario of implementation of a wireless communication system based on millimeter wave (mmWave) radio frequency (RF) repeaters, in accordance with an exemplary embodiment of the disclosure.

FIG. 3 is a diagram that illustrates an exemplary scenario of implementation of a wireless communication system based on millimeter wave (mmWave) radio frequency (RF) repeaters, in accordance with an exemplary embodiment of the disclosure. FIG. 3 is explained in conjunction with elements from FIGS. 1 and 2. With reference to FIG. 3, there is shown an exemplary scenario 300 of a wireless communication system that include a central communication device 302 and a plurality of relay nodes 304A to 304N. There is further shown a plurality of communication systems 306, which includes a first Wi-Fi access point 306A, a second Wi-Fi access point 306B, a Bluetooth low energy (BLE)-only IoT device 306C, a ZigBee-based system 306D, a Bluetooth-based system 306E, a camera system 306F, and a cellular system 306G. The first Wi-Fi access point 306A may have two antennas 308 and may operate in 2.4 GHz frequency (i.e. network band) and the second Wi-Fi access point 306B may have a MIMO-based antenna system 310 and may operate in 5 GHz frequency. There is further shown a mmWave RF signal 312 of a specified frequency, such as 60 GHz frequency, as an output of the central communication device 302 and a wired medium, such as a fiber-optic cable 314, connected to the central communication device 302.

In accordance with the exemplary scenario 300, the central communication device 302 corresponds to the first communication device 102 and the plurality of relay nodes 304A to 304N corresponds to the plurality of second communication devices 104A to 104N. The plurality of communication systems 306 may be an example of the plurality of communication systems 106. In the exemplary scenario 300, the central communication device 302 may be communicatively coupled to the fiber-optic cable 314, for example, for accessing core network (e.g. Internet).

In accordance with an embodiment, the central communication device 302 may be configured to obtain a plurality of RF signals from the plurality of communication systems 306. For example, first Wi-Fi signals may be obtained from the first Wi-Fi access point 306A. Similarly, second Wi-Fi signals may be obtained from the second Wi-Fi access point 306B; a BLE signal may be obtained from the BLE-only IoT device 306C, a ZigBee signal may be obtained from the ZigBee-based system 306D, a Bluetooth signal may be obtained from the Bluetooth-based system 306E, a RF signal carrying video content may be obtained from the camera system 306F, and a cellular signal (e.g. a LTE or even a NR signal or a mmWave signal) may be obtained from the cellular system 306G.

In accordance with an embodiment, the central communication device 302 may be further configured to upconvert a frequency of each of the plurality of RF signals to a different frequency. In an implementation, in certain scenarios, the first Wi-Fi signals from the first Wi-Fi access point 306A and the second Wi-Fi signals from the second Wi-Fi access point 306B may operate in same frequency (i.e. the first frequency and the second frequency may be same, for example, 5 GHz). In such a case, at least one of the the first Wi-Fi signals and the second Wi-Fi signals is upconverted to a different frequency. In another scenario, the camera system 306F and the second Wi-Fi access point 306B may operate in same WLAN frequency (e.g. 5 GHz). In such a case, only the RF signal carrying video content from the camera system 306F may be upconverted to 5.2 GHz frequency. Alternatively, in another implementation, each of the first Wi-Fi signals (e.g. 2.4 GHz frequency), the second Wi-Fi signals (e.g. 5 GHz), the BLE signal, the ZigBee signal, the Bluetooth signal, the RF signal, and the cellular signal may be upconverted to a different frequency so that each RF signal received from each communication system of the plurality of communication systems 306 has a different upconverted frequency.

In accordance with an embodiment, the central communication device 302 may be further configured to map and align the plurality of RF signals corresponding to different communication protocols in accordance to a number of source antennas from which the plurality of RF signals is obtained. Examples of the different communication protocols include, but is not limited to Wi-Fi 2.4 GHz, 3.6 GHz, 5 GHz (i.e. IEEE 802.11 protocol and variations thereof), Zigbee protocol, Bluetooth protocol, BLE, or other protocols that typically operate in the range 1 MHz to 6 GHz or even higher). As the first Wi-Fi access point 306A have two antennas 308, thus, the two antennas 308 may be mapped to two corresponding signals in the 60 GHz mmWave RF signal 312. Similarly, the second Wi-Fi access point 306B that may have the MIMO-based antenna system 310 (e.g. four antennas) may be mapped to four corresponding signals in the 60 GHz mmWave RF signal 312. Similarly, one antenna of other systems may correspond to one corresponding signal in the mmWave RF signal 312.

The central communication device 302 may be further configured to merge the obtained plurality of RF signals corresponding to different communication protocols into the mmWave RF signal 312 of 60 GHz frequency. After the up-conversion and the mapping, the plurality of RF signals at different frequency are multiplexed to form a single beam of RF signal (i.e. the mmWave RF signal 312 of 60 GHz frequency). In an example, the plurality of RF signals at different frequency are multiplexed in a frequency division multiplexing. In another example, the plurality of RF signals at different frequency are multiplexed in a time-division multiplexing.

In an implementation, the central communication device 302 may be further configured to transmit the mmWave RF signal 312 at 60 GHz frequency to the relay node 304A. The relay node 304A may be configured to further transmit the mmWave RF signal 312 at 60 GHz frequency to the relay node 304B, which then further transmits to the relay node 304C, and so forth in a chain transmission to extend the coverage of the plurality of RF signals corresponding to different communication protocols.

In another implementation, the central communication device 302 may be further configured to transmit the mmWave RF signal 312 at 60 GHz frequency concurrently to the relay node 304A and the relay node 304B. Thereafter, the relay node 304A may be configured to further transmit the mmWave RF signal 312 at 60 GHz frequency to the relay node 304C and the relay node 304N in a parallel transmission. The central communication device 302 may be further configured to distribute the mmWave RF signal 312 at 60 GHz frequency in a chain transmission, a parallel transmission, or a combination of the parallel transmission and the chain transmission as a mesh network such that all the original RF signals (i.e. any of the plurality of RF signals) previously merged into the mmWave RF signal 312 are available everywhere in a defined area (e.g. an enterprise area) to be consumed by multiple end-user devices present in the defined area.

For example, certain end-user devices, such as a smart television, may be communicatively coupled to the relay node 304A. Thus, the relay node 304A may be configured to capture the mmWave wave RF signal 312 of 60 GHz frequency over-the-air and extract, from the mmWave RF signal 312, the first Wi-Fi signals in upconverted form and down convert the extracted the first Wi-Fi signals to recover the original first Wi-Fi signals. The relay node 304A may be at a distance from the first Wi-Fi access point 306A that is beyond the usual communication range (e.g. usual range of 2.4 GHz Wi-Fi is approximately 40 to 50 meters indoors and 92 to 100 meters outdoors) of the first Wi-Fi access point 306A. The provisioning of the first Wi-Fi signals in the form of the mmWave wave RF signal 312 to the relay node 304A improves the transmission speed and reduces latency and at the same time enables each individual end-user device, such as the smart television to quickly access its data stream over the extracted first Wi-Fi signals via the relay node 304A. Similarly, end-user devices having 5 GHz capable antenna may access its data stream over the extracted second Wi-Fi signals (e.g. of 5 GHz) provided by the relay node 304A. Further, end-user devices having Bluetooth-only capability may connect to the relay node 304 to access its data (meant for only the designated device) over the BLE signal extracted by the relay node 304A. Moreover, in some embodiments, the relay node 304A itself may be an end-user device, such as the smart television. In such a case, a data stream from Internet (i.e. the first type of communication network 108 (FIG. 1)) may be accessible directly over the mmWave wave RF signal 312 in a high data rate (a multi-gigabit data rate, such as greater than 5 Gbps or even greater than 8 Gbps), whereas the smart television that acts as the relay node 304B may also extract other RF signals merged in the mmWave wave RF signal 312 and provide to other end-user devices wirelessly connected to the smart television. Similar to the relay node 304B, the other relay nodes, such as relay node 304B, the relay node 304C, or the relay node 304N, may capture the mmWave RF signal 312 at 60 GHz frequency, extract one or more of a wireless local area network signal, a wireless personal area network signal, or a combination thereof, from the mmWave wave RF signal 312, and provide to corresponding end-user devices communicatively coupled to corresponding relay nodes (i.e. the relay node 304B, or the relay node 304C, or the relay node 304N). Thus, a high-performance wireless content (e.g. data, audio, and video including 4K or 8K video) communication is achieved for an always connected experience.

Figure 4:
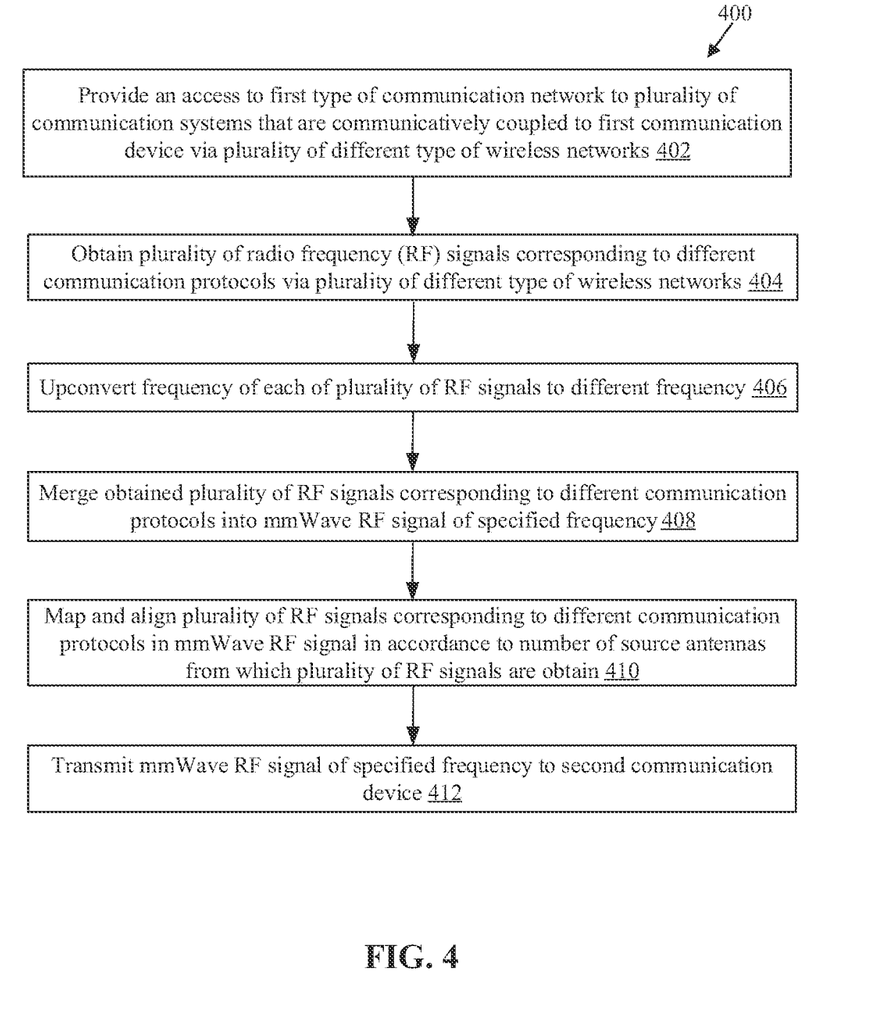
FIG. 4 is a flowchart that illustrates an exemplary communication by a wireless communication system based on millimeter wave (mmWave) radio frequency (RF) repeaters, in accordance with an embodiment of the disclosure.

FIG. 4 is a flowchart that illustrates exemplary communication by a wireless communication system based on millimeter wave (mmWave) radio frequency (RF) repeaters, in accordance with an embodiment of the disclosure. FIG. 4 is explained in conjunction with elements from FIGS. 1, 2, and 3. With reference to FIG. 4, there is shown a flow chart 400 comprising exemplary operations 402 through 412 by the first communication device 102.

At 402, an access to a first type of communication network may be provided to the plurality of communication systems 106 that are communicatively coupled to the first communication device 102 via the plurality of different type of wireless networks 110. The DSP 206 may be configured to provide the access to the first type of communication network to the plurality of communication systems 106.

At 404, a plurality of radio frequency (RF) signals corresponding to different communication protocols may be obtained via the plurality of different type of wireless networks 110. The receiver circuitry 212 may be configured to obtain the plurality of radio frequency (RF) signals corresponding to different communication protocols via the plurality of different type of wireless networks 110.

At 406, a frequency of each of the plurality of RF signals may be upconverted to a different frequency. The DSP 206 may be configured to upconvert the frequency of each of the plurality of RF signals to a different frequency.

At 408, the obtained plurality of RF signals corresponding to different communication protocols are merged into a mmWave RF signal of a specified frequency. The multiprotocol combiner circuit 214 may be configured to multiplex the obtained plurality of RF signals corresponding to different communication protocols are merged into the mmWave RF signal.

At 410, the plurality of RF signals corresponding to different communication protocols are mapped and aligned in the mmWave RF signal in accordance to a number of source antennas from which the plurality of RF signals are obtained. The DSP 206 may be configured to map and align the plurality of RF signals corresponding to different communication protocols in the mmWave RF signal in accordance to a number of source antennas from which the plurality of RF signals are obtained.

At 412, the mmWave RF signal of the specified frequency is transmitted to the second communication device 104A. The transmitter circuitry 216 may be configured to transmit the mmWave RF signal of the specified frequency to the second communication device 104A. Each of the plurality of RF signals communicated over a corresponding type of wireless network of the plurality of different type of wireless networks 110 has a defined communication range. The DSP 206 may be configured to extend a coverage of the plurality of RF signals corresponding to the different communication protocols beyond the defined communication range based on the transmit of the mmWave RF signal of the specified frequency that includes the plurality of RF signals. In an implementation, the method further includes providing the mmWave RF signal of the specified frequency to the plurality of second communication devices 104A to 104N in a chain transmission or a parallel transmission. At least one of the merged plurality of RF signals may be extracted from the mmWave signal 112 at each of the plurality of second communication devices 104A to 104N.

Various embodiments of the disclosure may provide a non-transitory computer-readable medium having stored thereon, computer implemented instructions that when executed by a computerized device causes the computerized device to execute operations, the comprising providing access, by the first communication device 102, to the first type of communication network 108 to the plurality of communication systems 106 that are communicatively coupled to the first communication device 102 via the plurality of different type of wireless networks 110. A plurality of radio frequency (RF) signals corresponding to different communication protocols are obtained via the plurality of different type of wireless networks 110. The obtained plurality of RF signals corresponding to different communication protocols are merged into the mmWave RF signal of a specified frequency. The mmWave RF signal of the specified frequency is transmitted to the second communication device 104A.

Various embodiments of the disclosure may provide the wireless communication system 100 (FIG. 1). The wireless communication system 100 includes the first communication device 102 (FIG. 1) that comprises the DSP 206 that is configured to provide access to the first type of communication network 108 to the plurality of communication systems 106 that are communicatively coupled to the first communication device 102 via the plurality of different type of wireless networks 110. The DSP 206 may be further configured to obtain a plurality of radio frequency (RF) signals corresponding to different communication protocols via the plurality of different type of wireless networks 110. The DSP 206 may be further configured to merge the obtained plurality of RF signals corresponding to different communication protocols into the mmWave RF signal of a specified frequency. The DSP 206 may be further configured to transmit the mmWave RF signal of the specified frequency to a second communication device (such as the second communication device 104A).

Various embodiments of the disclosure may provide the wireless communication system 100 (FIG. 1), which includes the first communication device 102 (FIG. 1) that comprises the DSP 206 and the second communication device 104A. The DSP 206 is configured to obtain a plurality of radio frequency (RF) signals corresponding to different communication protocols via the plurality of different type of wireless networks 110. The DSP 206 may be further configured to merge the obtained plurality of RF signals corresponding to different communication protocols into the mmWave RF signal of a specified frequency. The DSP 206 may be further configured to transmit the mmWave RF signal of the specified frequency to a second communication device (such as the second communication device 104A). The second communication device 104A comprises a second digital signal processor (similar to that of DSP 206) that is configured to extract, from the transmitted mmWave RF signal, a wireless wide area network signal, a wireless local area network signal, a wireless personal area network signal, or a combination thereof that corresponds to the plurality of RF signals.

In accordance with an embodiment, the first communication device 102 and the second communication device 104A is one of: a fifth generation (5G) modem, a 5G wireless access point, a multiprotocol wireless range extender device, an evolved-universal terrestrial radio access-new radio (NR) dual connectivity (EN-DC) device, a NR-enabled relay node, a NR-enabled repeater device, a wireless local area network-enabled device, a wireless personal area network-enabled device, a mmWave-enabled device, or a 60 gigahertz (GHz) capable device. The specified frequency of the mmWave RF signal may be 60 gigahertz (GHz).

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor or processor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A wireless communication system, comprising:
a first communication device that comprises a digital signal processor, wherein the digital signal processor is configured to:
provide access to a first type of communication network to a plurality of communication systems, wherein each of the plurality of communication systems is communicatively coupled to the first communication device via a plurality of different type of wireless networks;
obtain a plurality of radio frequency (RF) signals corresponding to different communication protocols from the plurality of communication systems via the plurality of different type of wireless networks, wherein each communication system is associated with a corresponding communication protocol of the different communication protocols;
upconvert a frequency of each of the plurality of RF signals to a different frequency such that each of the plurality of RF signals gets a different upconverted frequency;
merge the obtained plurality of RF signals corresponding to different communication protocols into a mmWave RF signal of a specified frequency; and
transmit the mmWave RF signal of the specified frequency to a second communication device.

2. The wireless communication system according to claim 1, wherein the upconversion of the frequency comprises manipulation of at least one of a frequency, an amplitude, or a phase of the RF signals.

3. The wireless communication system according to claim 1, wherein the plurality of RF signals upconverted to the different frequency are multiplexed by one of a frequency division multiplexing or a time-division multiplexing.

4. The wireless communication system according to claim 1, wherein the digital signal processor is further configured to map and align the plurality of RF signals in accordance to a number of source antennas from which the plurality of RF signals are obtained.

5. The wireless communication system according to claim 1, wherein each of the first communication device and the second communication device is one of: a fifth generation (5G) modem, a 5G wireless access point, a multiprotocol wireless range extender device, an evolved-universal terrestrial radio access-new radio (NR) dual connectivity (EN-DC) device, a NR-enabled relay node, a NR-enabled repeater device, a wireless local area network-enabled device, a wireless personal area network-enabled device, a mmWave-enabled device, or a 60 gigahertz (GHz) capable device.

6. The wireless communication system according to claim 1, wherein the plurality of different type of wireless networks correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network.

7. The wireless communication system according to claim 1, wherein
the digital signal processor is further configured to provide the mmWave RF signal of the specified frequency to a plurality of second communication devices in a chain transmission or a parallel transmission,
the plurality of second communication devices includes the second communication device, and
each second communication device of the plurality of second communication devices is configured to extract, from the mmWave RF signal, at least one of the merged plurality of RF signals.

8. The wireless communication system according to claim 1, wherein
each of the plurality of RF signals communicated over a corresponding type of wireless network of the plurality of different type of wireless networks has a defined communication range, and
a coverage of the plurality of RF signals corresponding to the different communication protocols is extended beyond the defined communication range based on the transmit of the mmWave RF signal of the specified frequency that includes the plurality of RF signals.

9. The wireless communication system according to claim 1, wherein the different communication protocols correspond to a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, or different variations of wireless wide area network (WWAN), wireless local area network (WLAN), or wireless personal area network (WPAN) protocols.

10. A wireless communication system, comprising:
a first communication device and a second communication device, wherein the first communication device comprises a first digital signal processor that is configured to:
obtain a plurality of radio frequency (RF) signals corresponding to different communication protocols from a plurality of communication systems, wherein each of the plurality of communication systems is communicatively coupled to the first communication device via a plurality of different type of wireless networks, wherein each communication system is associated with a corresponding communication protocol of the different communication protocols;
upconvert a frequency of each of the plurality of RF signals to a different frequency such that each of the plurality of RF signals gets a different upconverted frequency;
merge the obtained plurality of RF signals corresponding to different communication protocols into a mmWave RF signal of a specified frequency; and
transmit the mmWave RF signal of the specified frequency to the second communication device,
wherein the second communication device comprises a second digital signal processor that is configured to down convert the upconverted frequency to recover original RF signals.

11. A wireless communication method, comprising:
in a first communication device that comprises a digital signal processor (DSP):
providing, by the DSP, access to a first type of communication network to a plurality of communication systems, wherein each of the plurality of communication systems is communicatively coupled to the first communication device via a plurality of different type of wireless networks;
obtaining, by the DSP, a plurality of radio frequency (RF) signals corresponding to different communication protocols from the plurality of communication systems via the plurality of different type of wireless networks, wherein each communication system is associated with a corresponding communication protocol of the different communication protocols;

upconverting, by the DSP, a frequency of each of the plurality of RF signals to a different frequency such that each of the plurality of RF signals gets a different upconverted frequency;

merging, by the DSP, the obtained plurality of RF signals corresponding to different communication protocols into a mmWave RF signal of a specified frequency; and transmitting, by the DSP, the mmWave RF signal of the specified frequency to a second communication device.

12. The method according to claim 11, wherein the upconverting of the frequency comprises manipulation of at least one of a frequency, an amplitude, and a phase of the RF signals.

13. The method according to claim 11, further comprising multiplexing, by the DSP, the plurality of RF signals upconverted to the different frequency using one of a frequency division multiplexing or a time-division multiplexing.

14. The method according to claim 11, further comprising:

providing, by the DSP, the mmWave RF signal of the specified frequency to a plurality of second communication devices in a chain transmission or a parallel transmission, wherein the plurality of second communication devices includes the second communication device, and each second communication device of the plurality of second communication devices is configured to extract, from the mmWave RF signal, at least one of the merged plurality of RF signals.

15. The method according to claim 11, wherein each of the plurality of RF signals communicated over a corresponding type of wireless network of the plurality of different type of wireless networks has a defined communication range, and a coverage of the plurality of RF signals corresponding to the different communication protocols is extended beyond the defined communication range based on the transmit of the mmWave RF signal of the specified frequency that includes the plurality of RF signals.

16. The method according to claim 11, wherein the specified frequency of the mmWave RF signal is in the range of 10 gigahertz (GHz) to 300 GHz.

17. The method according to claim 11, wherein the specified frequency of the mmWave RF signal is 60 gigahertz (GHz).

18. The method according to claim 11, wherein the first communication device and the second communication device is one of: a fifth generation (5G) modem, a 5G wireless access point, a multiprotocol wireless range extender device, an evolved-universal terrestrial radio access-new radio (NR) dual connectivity (EN-DC) device, a NR-enabled relay node, a NR-enabled repeater device, a wireless local area network-enabled device, a wireless personal area network-enabled device, a mmWave-enabled device, or a 60 gigahertz (GHz) capable device.

* * * * *